United States Patent
Clement et al.

(10) Patent No.: US 9,084,090 B1
(45) Date of Patent: Jul. 14, 2015

(54) AUTOMATIC DEVICE MODE BASED ON PHYSICAL LOCATION OF USER IN A VEHICLE

(71) Applicant: Google Inc., Mountain View, CA (US)

(72) Inventors: Manuel Christian Clement, Felton, CA (US); Robertus Christianus Elisabeth Mariet, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/288,518

(22) Filed: May 28, 2014

Related U.S. Application Data (62) Division of application No. 13/630,714, filed on Sep. 28, 2012, now Pat. No. 8,768,539.

(51) Int. Cl.
 *H04W 4/04* (2009.01)
 *B60W 10/18* (2012.01)
 *B60W 10/20* (2006.01)
 *B60W 50/00* (2006.01)

(52) U.S. Cl.
 CPC .............. *H04W 4/046* (2013.01); *B60W 10/18* (2013.01); *B60W 10/20* (2013.01); *B60W 50/0098* (2013.01); *B60W 2050/0001* (2013.01)

(58) Field of Classification Search
 CPC ..... H04W 4/046; B60W 10/18; B60W 10/20; B60W 50/0098; B60W 2050/0001
 USPC ........................... 701/2, 36, 41, 48
 See application file for complete search history.

(56) References Cited

U.S. PATENT DOCUMENTS

2012/0028680 A1* 2/2012 Breed ..................... 455/556.1
2013/0295901 A1* 11/2013 Abramson et al. ............ 455/418

OTHER PUBLICATIONS

Spinelli, Mike "Tech Trend: Control Your Car With Your Smartphone" Mar. 5, 2010, Popular Science.
Mays, Kelsey "Mercedes-Benz mbrace Plus: Worth the Cost?" Feb. 16, 2011, http://blogs.cars.com/kickingtires/2011/02/mercedes-mbrace-worth-the-cost.html.

\* cited by examiner

*Primary Examiner* — Mary Cheung
*Assistant Examiner* — Brian P Sweeney
(74) *Attorney, Agent, or Firm* — Lerner, David, Littenberg, Krumholz & Mentlik, LLP (57) ABSTRACT

One aspect of the disclosure provides a control device that is located inside the passenger compartment of a vehicle. The control device may include a portable computing device configured to execute software that effectively enables passengers to use a touch screen (or another input device) to perform control actions for the vehicle that would otherwise take a flip of a switch, turning of a knob, or pressing of a pedal. For example, the portable computing device may be used to steer the vehicle or apply the brakes of the vehicle. The capabilities of the portable computing device are subject to location-specific permissions. The portable computing device, for example, may be allowed to steer the vehicle only when it is located in the area of the vehicle's driver seat.

20 Claims, 9 Drawing Sheets

AUTOMATIC DEVICE MODE BASED ON PHYSICAL LOCATION OF USER IN A VEHICLE

CROSS-REFERENCE TO RELATED APPLICATIONS

The present application is a divisional of U.S. application Ser. No. 13/630,714, filed on Sep. 28, 2012, the disclosure of which is hereby incorporated herein by reference.

BACKGROUND

Smart vehicles rely on computing systems to aid in the transport of passengers. The computing systems may control the operation of various vehicle systems, such as braking, steering, and acceleration systems, and they may be used to guide the autonomous vehicles from one location to another. Furthermore, such computing systems may control the operation of additional vehicle systems, such as climate control systems, entertainment systems, navigation systems, automatic window systems, and windshield wiper systems. Over the course of their operation, the computing systems may receive user input for controlling the operation of their respective smart vehicles. The user input may require the vehicles to perform any action that is normally associated with the operation of vehicles.

SUMMARY

In one aspect, user instructions may be submitted to a vehicle via a portable computing device, such as a tablet or a smart phone. The instructions may specify a new travel destination, a new travel route, or an action that the user would like the vehicle to perform, such as steering, applying the brakes, accelerating, opening a window, turning up the volume on the vehicle's radio, or activating the vehicle's interior lights. Using the portable computing device to provide user input to the vehicle may increase the ease at which users interact with their vehicles.

In another aspect, a method is provided that includes receiving, over a wireless link, an instruction to change a state of a vehicle system, the vehicle system including at least one of a mechanical component that is part of a vehicle or an electronic component that is part of the vehicle. The instruction is transmitted by a portable control device and received by a vehicle control unit that is operatively connected to the vehicle system. The vehicle control unit includes a processor coupled to a memory. The method further includes identifying a current location of the portable control device within a passenger compartment of the vehicle, and depending on the current location of the portable control device, performing one of the following tasks: executing the instruction when it is determined that the portable control device is located in a first region in the passenger compartment of the vehicle, or refusing to execute the instruction when it is determined that the portable control device is located in a second region in the passenger compartment of the vehicle. In some instances, the vehicle system may further be one of a steering system, an acceleration system, or a braking system.

The method may further include determining, based on the current location of the portable control device, whether the portable control device is permitted to output a first user interface component for calling the instruction from the portable control device and outputting the first user interface component, by the portable control device, upon determining that the first user interface component is permitted to be output. The portable control device may further be one of a smart phone, a tablet, or a laptop. The portable control device may further be configured to store, in a memory, a data structure that relates the first user interface component with the first region in the passenger compartment of the vehicle, thereby indicating that the portable control device is permitted to output the first user interface component when the portable control device is located in the first region. The first input component may be part of a first user interface and the data structure may further indicate that the first user interface is permitted to be output by the portable control device when the portable control device is located in the first region.

The memory of the vehicle control unit may further store a data structure that associates the instruction with one or more regions in the passenger compartment of the vehicle from where the instruction is permitted to be executed. In some instances, the method may further include accessing the data structure and determining whether the instruction should be executed based on the current location of the portable control device. Furthermore, the method may further include transmitting to the portable control device a message indicating that the instruction will not be executed. Moreover, the method may further include a user input indicating whether the instruction is permitted to be executed when the portable control device is located in the first region.

In yet another aspect, a vehicle is provided that includes a passenger compartment, a plurality of vehicle systems, and a vehicle control unit operatively connected to each vehicle system. The passenger compartment is configured to accommodate one or more passengers. The vehicle control unit includes a processor and a memory. The memory stores (i) a first indication of a first location within the passenger compartment from where a portable device is permitted to change the state of a first vehicle system of the plurality and (ii) a second indication of a second location within the passenger compartment from where the portable device is permitted to change the state of a second vehicle system of the plurality. The processor is configured to receive a first instruction from the portable control device to change a first state of the first vehicle system, receive a second instruction from the portable control device to change a second state of the second vehicle system, and determine a current location of the portable control device in the passenger compartment. The processor is further configured to determine, based on the first indication and the current location of the portable control device, whether the first instruction is permitted to be executed, determine, based on the second indication and the current location of the portable control device, whether the second instruction is permitted to be executed, and execute the first instruction, but not the second instruction, in response to determining that only the first instruction is permitted to be executed when the portable control device is located at its current location.

The first system may further be a steering system and the first instruction may further be permitted to be executed only when the portable control device is located at a driver seat of the vehicle. Alternatively, the first system may further be an entertainment system and the first instruction may further be permitted to be executed only when the portable control device is located at a driver seat or a front passenger seat of the vehicle.

The first location may further be part of a first region of the passenger compartment and the second location is part of a second region of the passenger compartment. The portable control device may further be one of a smart phone, a tablet, or a laptop. The portable control device may further be connected to the vehicle control unit via a wireless connection.

In yet another aspect, a vehicle is provided that includes a passenger compartment, a plurality of vehicle systems, and a vehicle control unit. The vehicle control unit includes a processor and a memory. The memory stores a permissions structure having one or more entries, each entry identifying an instruction and one or more regions in the passenger compartment from where the instruction is permitted to be invoked. The processor is configured to receive, from a portable control device, an instruction to change a state of first vehicle system from the plurality and determine a current location of the portable control device. The processor is further configured to determine, based on the permissions structure, whether the current location is a location from where the first instruction is permitted to be executed and execute the first instruction when and only when it is determined that the first instruction is permitted to be executed from the current location.

The portable control device may further be connected to the vehicle control unit via a wireless connection. The portable control device may further be connected to the vehicle control unit via a wired connection. The location of the portable control device may further be determined based on a radio signal transmitted by the portable control device. The plurality of vehicle systems may further include at least one of a steering system, acceleration system, braking system, a climate control system, and an entertainment system. The first instruction may further be an instruction to perform at least one of steering the vehicle, braking, activating a blinker, activating headlights of the vehicle, stopping the vehicle, changing a temperature setting of a heating or air conditioning system, or changing a volume on an audio system. The portable control device may further be one of a tablet, a laptop, or a smart phone.

In yet another aspect, an apparatus is provided that includes an output device, a memory, and a processor coupled to the output device and the memory. The memory stores a data structure that relates: (i) a first user interface component with a first region in a passenger compartment of a vehicle, thereby indicating that the apparatus is permitted to output the first user interface component on the output device when the apparatus is located in the first region, and (ii) a second user interface component with a second region in the passenger compartment of the vehicle, thereby indicating that the apparatus is permitted to output the second user interface component on the output device when the apparatus is located in the second region. The processor is configured to determine a current location of the apparatus within the vehicle, determine, based on the current location of the apparatus and the data structure stored in the memory, whether the first user interface component is permitted to be output, and determine, based on the current location of the apparatus and the data structure stored in the memory, whether the second user interface component is permitted to be output. The processor is further configured to output the first user interface component using the output device upon determining that the first user interface component is permitted to be output and output the second user interface component using the output device upon determining that the second user interface component is permitted to be output.

The output device may further be one of a display screen or a speaker and outputting the first user interface component using the output device may further include one of rendering the first user interface component on the display screen or playing a sound representing the first user input component. The vehicle may further include a first vehicle system and a second vehicle system. The first user interface component may further be for receiving user input for changing a state of the first vehicle system. The second user interface component may further be for receiving user input for changing a state of the second vehicle system.

The first vehicle system may further be a braking system and the second vehicle system may further be an entertainment system. The first user interface component may further be part of a first user interface. The second user interface component may further be part of a second user interface. The data structure may further indicate that the first user interface is permitted to be output using the output device when the apparatus is located in the first region. The data structure may further indicate that the second user interface is permitted to be output using the output device when the apparatus is located in the second region.

DETAILED DESCRIPTION

In one aspect, a vehicle is provided that is configured to receive user input for controlling the vehicle. The user input may be entered via a control device, such as a portable computing device. Examples of such devices may include a cell phone, a tablet, a laptop, or a portable gaming device. By way of example, the user input may specify a control action for the vehicle to perform. Examples of control actions may include steering the vehicle, braking the vehicle, accelerating the vehicle, shifting gears, changing a transmission mode, changing settings on an electronic stability control system, activating low beams, activating high beams, turning on/off of an interior light, turning on of windshield wipers, changing the settings of a climate control system, (e.g., changing temperature inside a passenger compartment of the vehicle), changing settings of an entertainment system (e.g., changing the volume, changing the radio station playing, playing a particular media file), changing settings on a navigation system (e.g., entering a new travel destination), changing cruise control settings, or any other action that may be performed over the course of the vehicle's usage by a driver and/or passengers of the vehicle.

The operation of the control device may be subject to predetermined permission settings. For example, the control device may be configured to steer the vehicle only when it is permitted to steer the vehicle. Similarly, the control device may be configured to change the music on the radio, only when given permission to do so. As is further discussed below, the permission settings may be subject to the location of the control device within the vehicle's cab. Depending on its location, the control device may be permitted to perform different types of actions.

Having a permission management system is important with respect to ensuring the safety of the vehicle. For instance, it is unsafe for a 5-year old sitting in the rear seat of the vehicle to be allowed to steer the vehicle, via the control device, should he or she manage somehow to grab the control device and bring it in the backseat. To increase the vehicle's safety, the location of the control device inside the vehicle may be monitored and a determination may be made as to what region of the vehicle's cab the control device is located in. Possible regions may include a region where the driver's seat is located, a region where the front passenger's seat is located, and a region where the backseats are located.

In one example, the control device may be permitted to perform safety-critical actions, such as steering or applying the brakes, only if it is located in the region where the driver seat is located. In this regard, the ability to perform safety-critical actions may be denied when the control device is located elsewhere in the vehicle's cab. This ensures that only the person in the driver's seat retains control over aspects of the operation of the vehicle that are important with respect to safety. Nevertheless, the control device may be permitted to control non-safety critical aspects of the operation of the vehicle when it is located in other parts of the vehicle, like the backseat. For example, the control device may be permitted to perform actions from the backseat, such as activating an air-conditioner, rolling down a window, or changing the station playing on the vehicle's radio.

Figure 1:
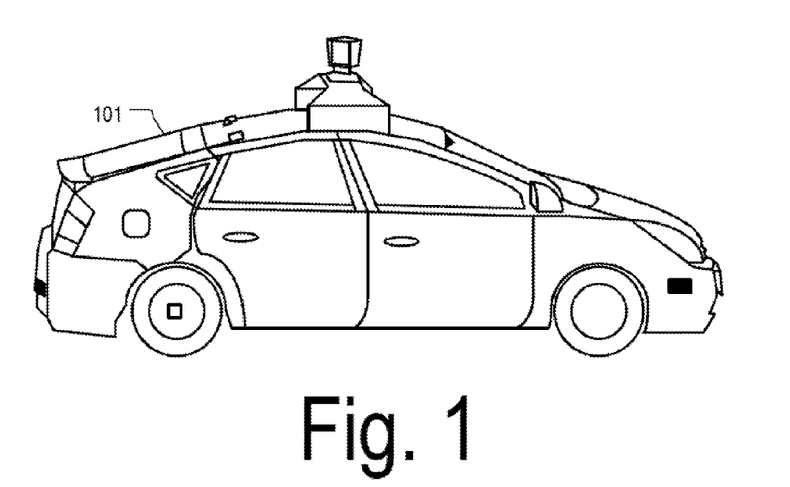
FIG. 1 depicts a side view of a vehicle in accordance with aspects of the disclosure.

FIG. 1 is a schematic diagram of vehicle 101 in accordance with one aspect of the disclosure. Vehicle 101 may be an autonomous or semi-autonomous vehicle capable of driving form one point to another without (or with partial) user input. Although in this example vehicle 101 is an automobile, in various other examples vehicle 101 may be any type of vehicle adapted to carry one or more people, such as a truck, motorcycle, bus, boat, airplane, helicopter, lawnmower, recreational vehicle, amusement park vehicle, farm equipment, construction equipment, tram, golf cart, trains, or trolley. Furthermore, although in this example vehicle 101 is an autonomous or semi-autonomous vehicle, in other examples vehicle 101 may be a human-operated vehicle that lacks any automation.

Figure 2:
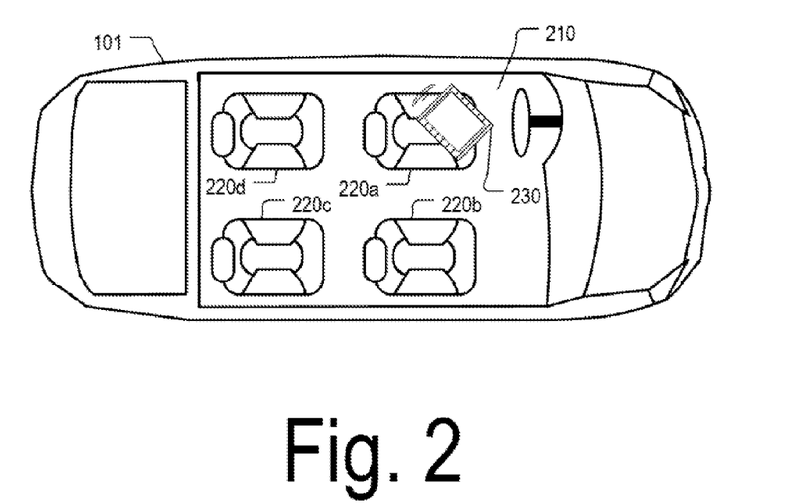
FIG. 2 depicts a top-down cut out view of the vehicle of FIG. 1.

As shown in FIG. 2, vehicle 101 includes a passenger compartment 210 having a driver seat 220a and passenger seats 220b-d. Inside the passenger compartment 210 may be a control device 230 used by the vehicle's driver and/or passengers to control the vehicle. The control device 230 may be configured to execute software that enables the vehicle's driver and passengers to perform control actions, such as those discussed above. The software may effectively enable the vehicle's occupants to use a touch screen (or another input component/peripheral) of the control device 230 to perform actions that would otherwise take a flip of a switch, turning of a knob, or pressing of a pedal.

The operational capabilities of the control device 230 may vary with the control device's location in the passenger compartment 210. If the control device 230, for example, is held by the driver occupying seat 220a as shown in FIG. 2, the portable device may be capable of steering or accelerating the vehicle 101. If, however, the portable device 230 is held by a passenger occupying the seat 220b, the portable device may be permitted to control the vehicle's entertainment system, but not steer or apply the brakes of the vehicle. Furthermore, if the control device 230 is in possession of a passenger occupying the backseat 220c, the portable device may only be permitted to roll down the window adjacent to that seat, but not do anything else. Put another way, varying the operational capabilities of the control device 230 in dependence upon its location may enable the allocation of different privileges to different among the occupants of the passenger compartment 210.

The control device 230 may be a tablet, a smart phone, a laptop, or another type of portable computing device. Moreover, in some instances, the control device 230 may be special-purpose hardware designed specifically to serve as a control interface for the vehicle 101. Although in the example of FIG. 2 the passenger compartment 210 is a vehicle cab that includes a single space for both the driver and passengers, in other examples the passenger compartment may include a plurality of spaces separated by dividers. For example, on airplanes, the passenger compartment may include one or more of the pilots' cockpit, the passenger cabins, and even the cargo area. Similarly, in a train, the passenger compartment may include the interior of a locomotive and/or the interior of one or more of the train's cars. The passenger compartment 210, in other words, may include one or more spaces on a vehicle that are human accessible or at least one or more spaces inside the vehicle where the control device 230 could fit.

Figure 3:
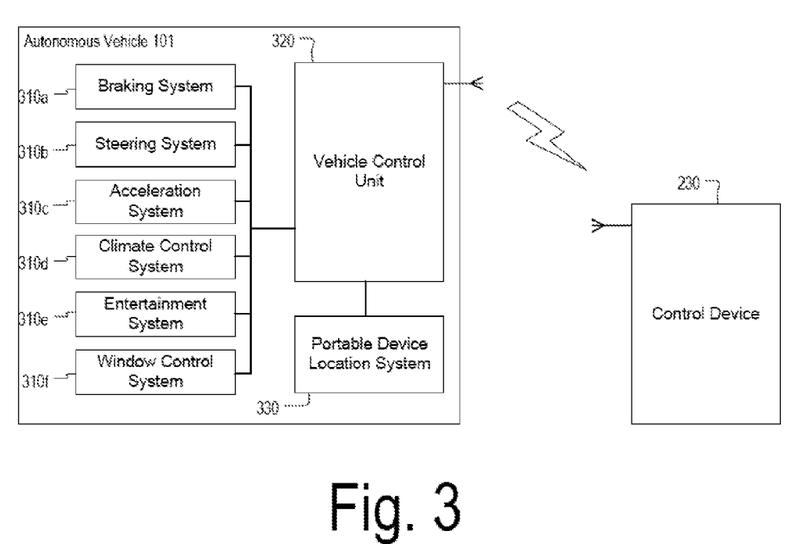
FIG. 3 depicts a schematic diagram of the vehicle of FIG. 1.

FIG. 3 depicts a schematic diagram of the vehicle 101 in accordance with aspects of the disclosure. As illustrated, vehicle 101 includes vehicle systems 310a-f, a vehicle control unit 320, and a portable device location system 330. The vehicle systems 310a-f may include a braking system 310a, a steering system 310b, an acceleration system 310c, a climate control system 310d, an entertainment system 310e, and a navigation system 310f. The above systems are provided only as an example and thus the vehicle systems 310a-f may include any type system that is capable of performing one or more functions that are normally associated with vehicles, such as braking, steering, playing the radio, rolling down the windows, turning on an air-conditioner, etc. Although the vehicle systems 310a-f are depicted as separate blocks, in some instances they may share components (e.g., computer hardware, mechanical hardware, software, etc.) or they may be fully integrated with one another.

In one example, a vehicle system may include one or more of a mechanical hardware components that are part of the vehicle (e.g., rack and pinion, engine, brakes, steering motor, suspension, steering pump, etc.) and/or software that is executed by computer hardware and used to control aspects of the operation of the mechanical hardware components. In another example, a vehicle system may include one or more electronic components that are part of the vehicle 101 (e.g., light bulb, music player, radio, air conditioner, windshield wiper motor, steering pump, etc.), and/or software that is executed by computer hardware and used to control aspects of the operation of the electric or electronic components. Furthermore, in yet another example, vehicle systems may include logic implemented in hardware (e.g. an FPGA or another controller) instead of software for controlling aspects of the operation of mechanical or electric vehicle components.

The vehicle control unit 320 may include a computing system for controlling at least some aspects of the operation of the vehicle 101. Vehicle control unit 320 may also be operatively connected to one or more of the vehicle systems 310a-f and it may be operable to change the state of any one of these systems. For example, the vehicle control unit 320 may interact with the braking system, steering system, and acceleration system, to steer, slow down, or accelerate the vehicle. Furthermore, as another example, the vehicle control unit 320 may interact with: the climate control system to change the temperature inside the passenger compartment 210, the entertainment system 310e to change the station playing on the radio, or the vehicle navigation system 310f to change a destination the vehicle is travelling to.

The vehicle control unit 320 may be coupled to the control device 230 via a wireless or wired connection and it may be operable to receive instructions from the control device 230 to change the state of one or more of the vehicle systems 310a-f. As discussed above, passengers and the driver of the vehicle 101 may use the control device 230 to perform actions, such as opening a window, turning on the headlights, slowing down, accelerating, or changing the station playing on the radio. In operation, once the control device 230 has received a user instruction for the vehicle to perform a given action, the control device 230 may forward an indication of the instruction to the vehicle control unit 320 for further execution. As discussed above, instructions may be executed in dependence of the location of the control device 230 within the passenger compartment 210.

The location system 330 may include hardware and/or software for determining the location of the control device 230 within the passenger compartment 210. In this example, the location system 330 includes receivers 610a-d (depicted in FIG. 6) located in different parts of the of the passenger compartment 210. The receivers 610a-b may take measurements of the strength of radio signal(s) transmitted by the control device 230 and forward those measurements to the vehicle control unit 320 where they are triangulated and used to determine the location of the control device 230. Although in this example, the location system 330 and the vehicle control unit 320 are depicted as separate blocks, in some instances, they may be (completely or partially) integrated together. The location system 330 described herein is provided as an example and the disclosure is not limited to any method for determining the location of the control device 230.

The vehicle control unit 320 may use the location system 330 to enforce location-based permissions on instructions received from the control device 230. As discussed above, some instructions, such as steering the vehicle 101, may be invoked only when the control device 230 is located in the area of the driver seat 220a. Thus, before executing an instruction invoked using the control device 230, the vehicle control unit 320 may determine the current location of the control device 230 in the passenger compartment 210 and execute the instruction only if that instruction is permitted to be invoked from the control device's current location.

Figure 4:
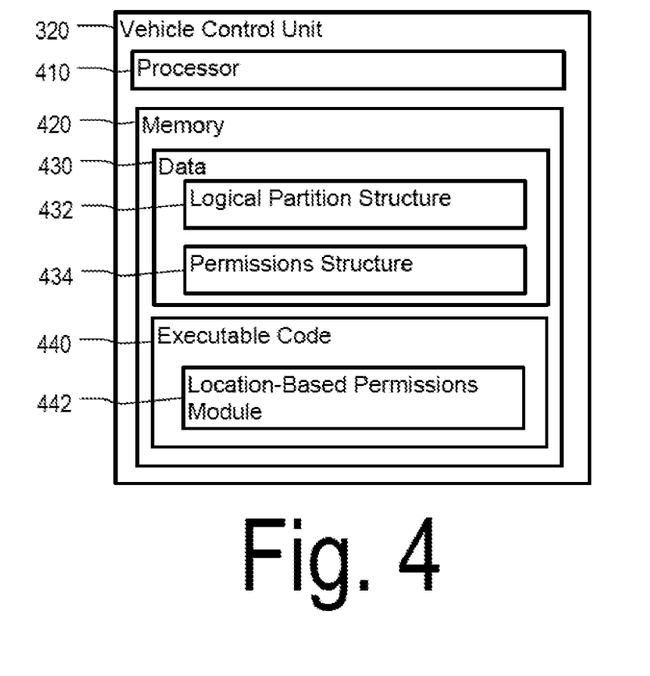
FIG. 4 depicts a schematic diagram of a vehicle control unit of the vehicle of FIG. 1.

FIG. 4 depicts a schematic diagram of the vehicle control unit 320 in accordance with aspects of the disclosure. As illustrated, the vehicle control unit 320 may include a processor 410 and memory 420. Memory 420 of vehicle control unit 320 may store information accessible by processor 410, including executable code 440 that may be executed by the processor 410. The memory also includes data 430 that may be retrieved, manipulated or stored by the processor. The memory may be of any type of tangible media capable of storing information accessible by the processor, such as a hard-drive, memory card, ROM, RAM, DVD, CD-ROM, write-capable, and read-only memories. The processor 410 may be any well-known processor, such as commercially available processors. Alternatively, the processor may be a dedicated controller such as an ASIC.

Data 430 may be retrieved, stored or modified by processor 410 in accordance with the executable code 440. For instance, although the system and method are not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Figure 8:
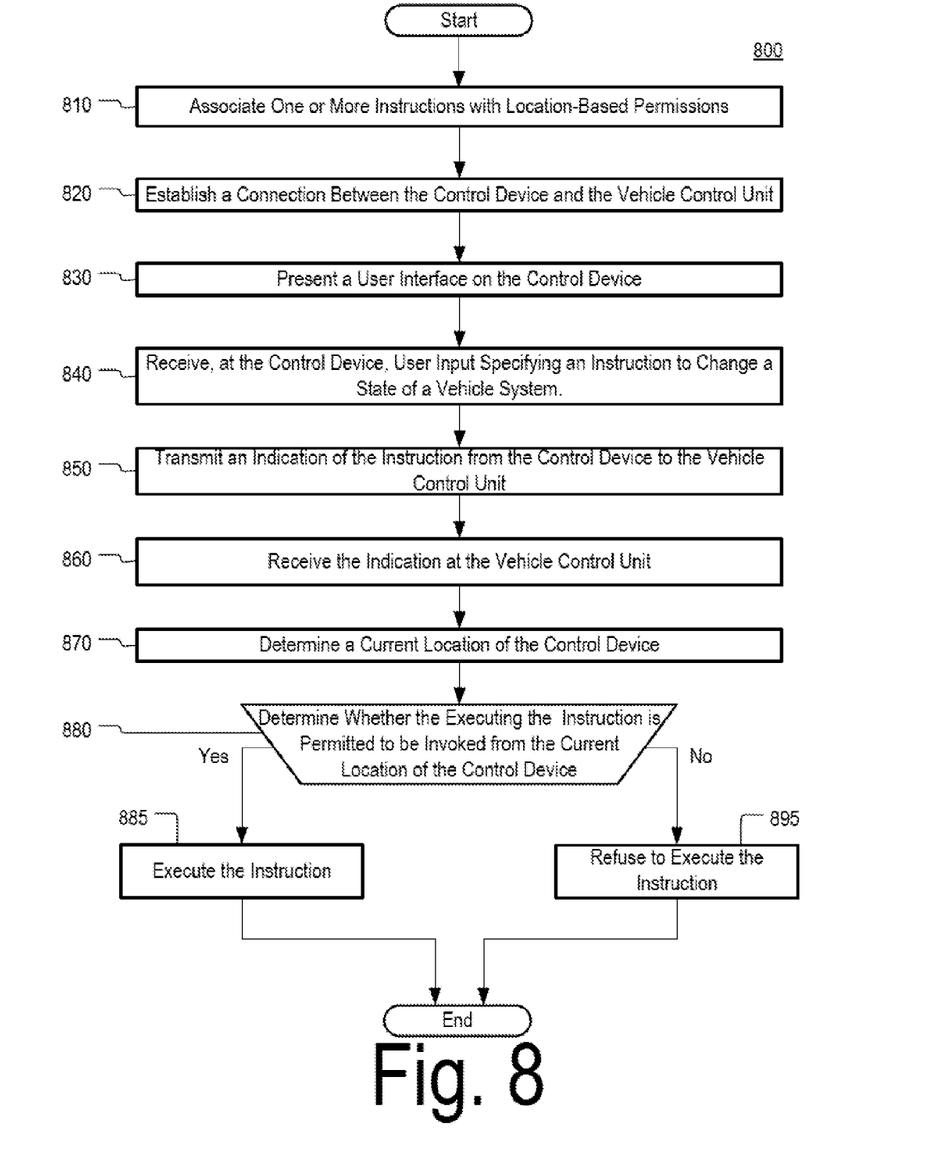
FIG. 8 depicts a schematic diagram of a process associated with controlling of the vehicle of FIG. 1 by the vehicle control unit of FIG. 4

The executable code 440 may perform at least some of the tasks of the process 800 depicted in FIG. 8. For example, the executable code 440 may include a location-based permissions module 442 that is configured to enforce location-based restriction policies. That is, when an instruction is received from the control device 230, the module 432 may determine the current location of the control device 230 in the passenger compartment 210 and execute the instruction only if the control device 230 is located in a region of the passenger compartment 210 where the instruction is permitted to be invoked from. Different regions within the passenger compartment 210 may be specified in partition structure 432 and different location-based restriction policies may be specified in permission structure 434. The structures 432 and 434 may be data structures, data files, or any other type of device (e.g. software or hardware) for storing information. Although the structures 432 and 434 are depicted as separate blocks, in other examples they may be integrated together. Furthermore, in some instances, the structures 432 and 434 may be stored on a remote device and accessed by the vehicle control unit 320 over a network connection.

Figure 5:
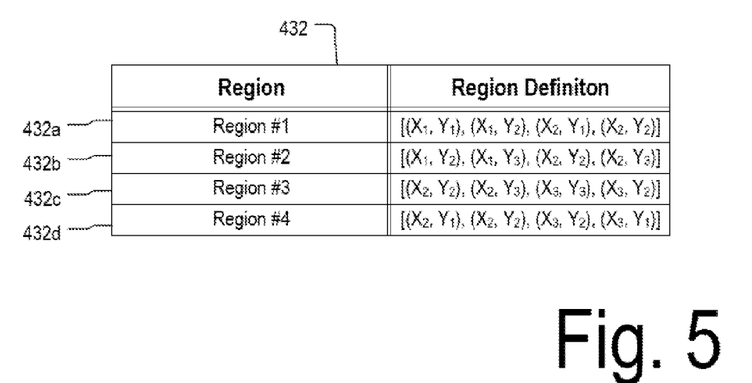
FIG. 5 depicts a schematic diagram of a data structure used to define different regions within a passenger compartment of the vehicle of FIG. 1.
Figure 6:
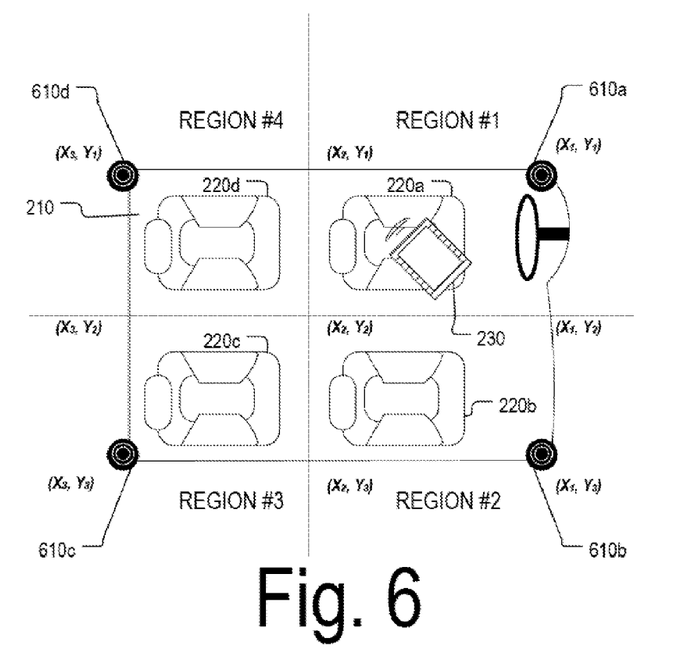
FIG. 6 depicts a schematic diagram of the passenger compartment of the vehicle of FIG. 1 showing the regions defined by the data structure of FIG. 5.

FIG. 5 depicts a schematic diagram of the logical partition structure 432. In this example, the logical partition structure 432 divides the passenger compartment 210 into four regions, numbered 1 through 4, respectively. As illustrated in FIG. 6, region #1 is collocated with the driver seat 220a, region #2 is collocated with the front passenger seat 220b, and regions #3 and #4 are collocated with the rear passenger seats 220c-d. The location of the control device 230, as discussed, may be determined using radio receivers 610a-d. The radio receivers may measure the power of radio signals emitted by the control device 230 and triangulate the signals to determine the location of the control device 230.

As illustrated in FIG. 5, the different regions of passenger compartment 210 may be represented as sets of coordinates. In one alternative example however, each region may be presented as a single coordinate and a radius. In another alternative example, however, regions #1-4 may be represented by 4-tupples of signal strength ranges (e.g., sets of signal strength ranges that are expected to be measured by each of the receivers 610a-d when the control device 230 is in a given region). Stated succinctly, the indications of regions of the logical partition structure 432 may include any type of information capable of being used to distinguish from one another different portions of the passenger compartment 210.

Although in this example the depicted passenger compartment includes a standard layout featuring two front seats and two backseats, in other examples other less conventional seating arrangements are possible. For instance, in autonomous vehicles, the driver's seat may be placed in another location, such as a location other than the front left (or right) portion of the vehicle compartment 210. In that regard, each one of the regions #1-4 may be located anywhere in the vehicle compartment 210 and each one of the regions #1-4 may have any shape or size. Also, there can may be any number of regions, and not just four (4) (e.g., 2, 3, 5, 7, 20, 120).

Furthermore, although in this example regions #1-4 exist in the same horizontal plane, in other examples the regions may be situated in different horizontal planes. For example, in double-deck vehicles (e.g., busses or planes), different regions may be specified on the different vehicle decks. Such regions, for example, may be located above or below one another. Accordingly, in such instances, the regions may be defined using three-dimensional coordinate systems or any other approach capable of accounting for the vertical positioning of a region within the passenger compartment 210.

Figure 7:
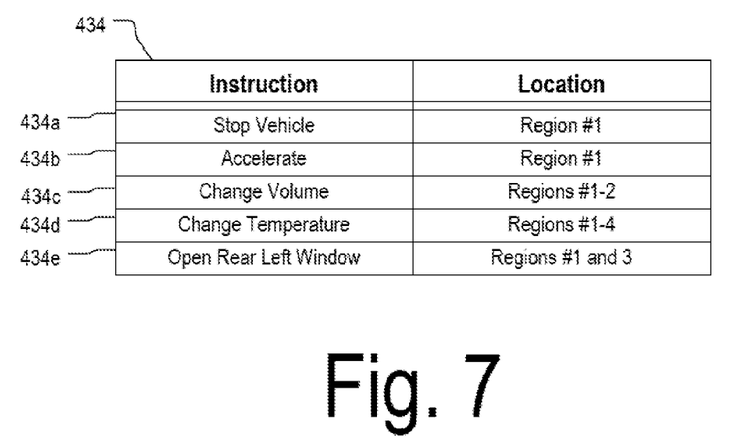
FIG. 7 depicts a schematic diagram of a data structure used to define location-based permissions for instructions that are executable by the vehicle control unit of FIG. 4.

FIG. 7 depicts a schematic diagram of the permissions structure 434. In this example, the structure includes a plurality of entries 434a-e. Each entry may include an indication of an instruction and an indication of one or more regions from where the instruction is permitted to be invoked. For instance, according to this example, the instructions "stop vehicle" or "accelerate" may be invoked by the control device 230 only when the control device 230 is located in region #1. Similarly, as another example, the instruction "change "radio station" may be invoked only when the control device 230 is located in regions #1-2, and the instruction "change temperature" may be invoked from anywhere in the passenger compartment 210.

FIG. 8 depicts a flowchart of a process 800 associated with the operation of the vehicle 101 in accordance with aspects of the disclosure. At task 810, the vehicle control unit 320 is configured to store location-based permissions for one or more instructions. In some instances, the permissions may be factory-specified and in other instances the permissions may be specified by the user. For example, a user may be presented with a user interface and allowed to enter via the user interface at least one of (1) an indication of an instruction and (2) an indication of at least one region in the passenger compartment 210 where the control device 230 is permitted to invoke the instruction from. The user interface may be presented on a display screen of the vehicle control unit 320, or alternatively, it may be presented on a display of the control device 230. In the latter instance, after the user input is entered, an indication of the user input may be communicated by the control device 230 to the vehicle control unit 320. The vehicle control unit 320 may then create and store a new entry in the permissions structure 432 based on the received user input.

At task 820, a connection between the control device 230 and the vehicle control unit 320 is established. The connection may be either wired or wireless. To establish the connection, any communications protocol may be utilized, such as TCP/IP, Bluetooth, USB, wireless USB, WiFi, or a custom communications protocol.

Figure 9A:
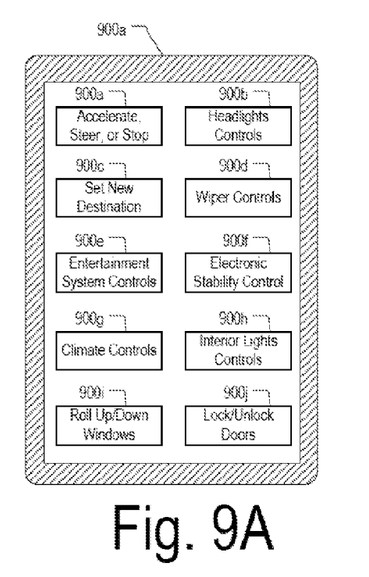
FIGS. 9A and 9B depict schematic diagrams of user interfaces that may be used to supply instructions to the vehicle control unit of FIG. 4.

At task 830, a user interface for controlling one or more aspects of the operation of vehicle 101 is presented on the control device 230. Examples of user interfaces that may be displayed on a display screen of the control device 230 are provided in FIGS. 9A-B, respectively. As illustrated in FIG. 9A, the user interface 900A may provide buttons 910a-j that enable control over different aspects of the operation of the vehicle 101. For example, clicking on the button 910a may lead users to a menu that enables the steering, stopping, or acceleration of the vehicle 101. Clicking on the button 910b may take users to a menu that enables the turning on/off of the vehicle's 101 headlights. Clicking on the button 910c may take users to a menu for setting a new destination for the vehicle 101 to travel to. Clicking on the button 910d may take users to a menu that enables the turning on/off of the vehicle's 101 windshield wipers. Clicking on the menu 910e may take users to a menu that enables controlling vehicle's 101 entertainment system. Clicking on the button 910f may take users to a menu that enables turning on/off of the vehicle's 101 electronic stability control. Clicking on the button 910g may take users to a menu that enables changing various climate control settings, such as turning on/off of an air conditioner or increasing the temperature in the passenger compartment 210. Clicking on the button 910h may take users to a menu that enables the turning on/off of the vehicle's 101 interior lights. Clicking on the button 910i may take users to a menu that enables the rolling up/down of the windows of the vehicle 101. Clicking on the button 910j may take users to a menu that enables the locking and unlocking of the vehicle's 101 doors. Various other buttons and controls may also be used.

Figure 9B:
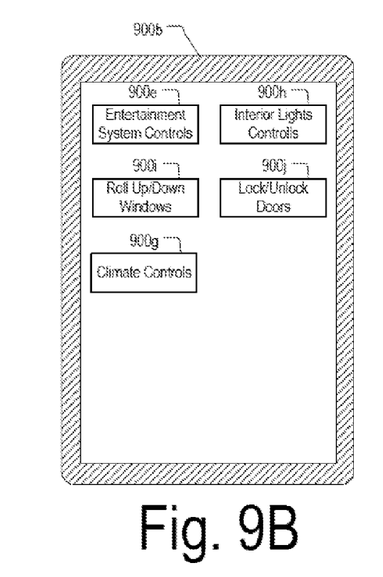

In some aspects, the user interface presented by the control device 230 may be varied in dependence upon the location of the control device 230 in the vehicle cab 210. For example, only if the control device 230 is located in region #1, the menu 900A may be displayed. By contrast, when the control device 230 is located in regions #2-3, the menu 900B may be displayed. As illustrated in this example, the interface 900A may include input components (e.g., buttons, text input field, sliders, check boxes, etc.) for safety-critical aspects of the operation of the vehicle 101, such as accelerating, steering, and braking, whereas the interface 900B may lack such input components for controlling safety-critical aspects of the operation of the vehicle 101.

Returning to FIG. 8, at task 840, user input is entered into the control device 230. The user input may be entered using a touch screen, trackball, keyboard, microphone, or any other user input device. The user input may specify an instruction to change a state of a vehicle system, such as the vehicle systems 310a-f, and as such it may identify a control action that is requested to be performed by the vehicle 101. At task 850, an indication of the instruction is transmitted by the control device 230 to the vehicle control unit 320. The transmitted indication is received by the vehicle control unit at task 860.

At task 870, the vehicle control unit 320 determines the current location of the control device 230. Without limitation, the current location of the control device 230 may be the location where the control device is located when task 870 is executed, the location where the control device is located when task 860 is executed, or the location of the control device 230 at another time instant that is substantially cotemporaneous with the time instant when either one of task 860 or task 870 is executed.

As discussed above, the current location of the control device 230 may be determined using the radio receivers 610a-d. In other examples, the control device 230 may determine its location and communicate it to the vehicle control unit 230. For example, instead of the radio receivers 610a-d, transmitters may be positioned at various locations in the vehicle 101 and the control device 230 may triangulate signal strength measurements from those transmitters to independently determine its location within the passenger compartment 210.

At task 880, the vehicle control unit 320 determines whether the instruction is permitted to be invoked from the current location of the control device 230. The determination may be based on the permissions structure 434 or another similar data structure. The determination may involve finding out whether the current location of the vehicle 101 is within one or more regions in the passenger compartment 210 where the instruction is permitted to be invoked from. If the current location of the control device 230 is within one of the regions where the instruction is permitted to be invoked from, task 885 is executed. Otherwise, if the control device 230 is outside of any regions where the instruction is permitted to be invoked from, task 895 is performed.

At task 885, the vehicle control unit 320 executes the instruction. By way of example, executing the instruction may involve the vehicle control unit 320 activating an actuator, closing a switch, or performing some other task necessary to accomplish the action requested by the user. At task 895, the vehicle control unit 320 refuses to execute the instruction. Refusing to execute the instruction includes refraining from executing the instruction. Furthermore, in some instances, but not necessarily, refusing to execute the instruction may include transmitting an indication back to the control device 230 that execution of the instruction has been refused.

Figure 10:
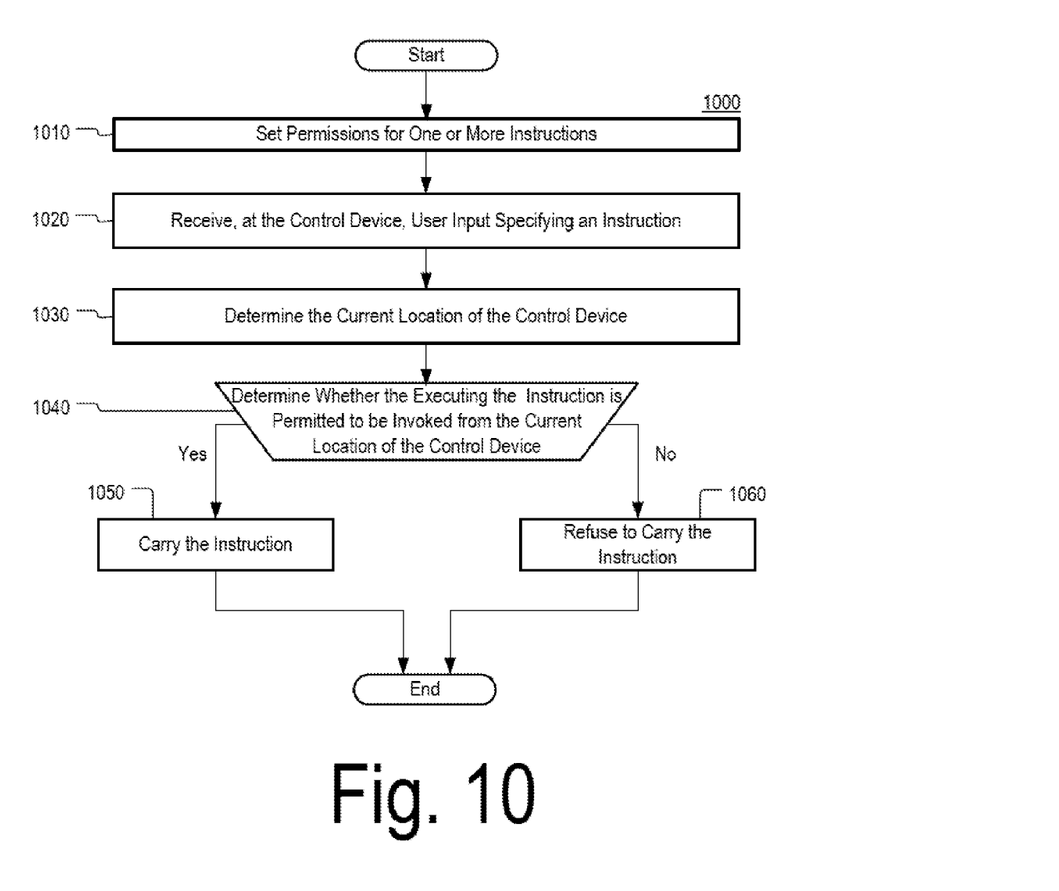
FIG. 10 depicts a schematic diagram of a process associated with the operation of the vehicle of FIG. 1 and/or the vehicle control unit of FIG. 4.

FIG. 10 depicts a flowchart of a process 1000 associated with the operation of the control device 230. Unlike the process 800, in this example, the control device 230 enforces location-based restrictions on instructions that are invoked via the control device 230. To this end, the control device 230 may store data structures, such as the logical partition structure 432 and the permissions structure 434, in local memory (e.g., in a volatile or non-volatile memory module that is part of the device) and use these data structures to enforce location-based permissions.

At task 1010, the control device 230 is configured to store location-based permissions for one or more instructions. In some instances, the permissions may be factory-specified and in other instances the permissions may be specified by the user. For example, a user may be presented with a user interface and allowed to enter via the user interface at least one of (1) an indication of an instruction and (2) an indication of at least one region in the passenger compartment 210 where the control device 230 is permitted to invoke the instruction from. The instructions may be related to the operation of the vehicle 101 (e.g., steer, brake, set destination, change interior temperature, open/lock doors) or alternatively, the instructions may be un-related to the operation of the vehicle 101 (e.g., make a phone call, send a text message, play a video game, open a text editing software application, play a movie, play a particular movie title). In some aspects, the location based permissions may be entered manually into the control device 230 by using a user interface that is presented on a display screen of the control device 230. In other aspects, the location-based permissions may be transmitted to the control device by a remote device, over a communications network connection.

At task 1020, user input is entered into the control device 230. The user input may be entered using a touch screen, trackball, keyboard, microphone, or any other input device. The user input may identify a control action that is requested to be performed by the vehicle 101 or the control device 230.

At task 1030, the control device 230 determines its current location within the passenger compartment 210. At task 1040, the control device 230 determines whether the instruction is permitted to be invoked from the current location of the control device 230. In one example, the determination may be based on a permissions structure, such as the permissions structure 434. The determination may involve determining whether the current location of the vehicle 101 is within one or more regions from where the instruction is permitted to be invoked. If the current location of the control device 230 is within one of the regions from where the instruction is permitted to be invoked, the control device 230 carries the instruction at task 1050. In one aspect, carrying the instruction may include transmitting an indication of the instruction to the vehicle control unit 230 for further execution. In another aspect, carrying the instruction may include executing the instruction by the control device 230. That is, in instances where the control device 230 is a smart phone, the control device 230 may initiate phone call, start a software application, or transmit the instruction to another computing device in the vehicle 101 that is not involved in controlling the operation of the vehicle (e.g., a computer terminal used by a stewardess).

Returning to task 1040, if the current location of the control device 230 is outside of the any of the regions from where the instruction is permitted to be invoked, the control device 230 refuses to carry the instruction at task 1060. Refusing to carry the instruction includes refraining from carrying the instruction. In some instances, but not necessarily, refusing to execute the instruction may include outputting, by the control device 230, of an indication that the instruction has been refused.

Figure 11:
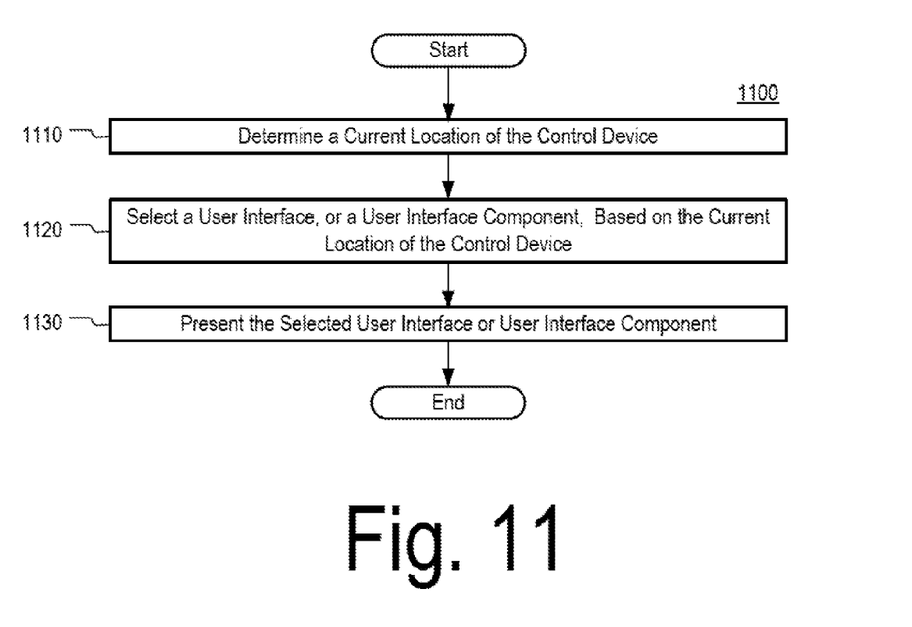
FIG. 11 depicts a schematic diagram of a process associated with the operation of the vehicle of FIG. 1 and/or the vehicle control unit of FIG. 4.

FIG. 11 depicts a flowchart of a process 1100 that is associated with the operation of the control device 230. Tasks in the process 1100 may be performed by the control device 230 or by both the control device 230 and the vehicle control unit 320. At task 1110, the current location of the control device 230 within the passenger compartment 230 is determined. As noted, the control device 230 may determine the current location by itself, or alternatively, it may receive an indication of the current location from the vehicle control unit 230. At task 1120, one of a plurality of user interfaces (or user interface components) is selected based on the location of the control device 230.

For example, returning to FIG. 9A, the interface 900a may be selected when the control device 230 is located in region #1 and the interface 900b may be presented when the control device is located in regions #2-4. The selection of user interfaces, or components thereof, may be implemented using a table, or another similar data structure, that relates one or more indications of regions in the passenger compartment 210 with identifiers of user interfaces or user interface components (e.g., menus, buttons, sliders, checkboxes) that may be displayed by the control device 230 when the control device 230 is located in those regions. For instance, the data structure may associate the interface 900a with region #1 and the interface 900b with regions #2-4. At task 1130, the control device 1230 presents the interface on a display screen. In other instances, where audio user interfaces are used, such as Interactive Voice Response interfaces, those interfaces may be presented using a speaker. The disclosure is not limited to any type of user interface or output device for presenting the user interface.

FIGS. 1-11 are provided as examples only. At least some of the tasks may be performed in a different order than represented, performed concurrently, or altogether omitted. In addition, other tasks may also be included. Although in the above examples, the location-based permissions module 442 is implemented using software, in other examples it may be implemented using hardware (e.g., implemented using an FPGA) or a combination of hardware and software. Furthermore, although the above examples discuss withholding presentation of user interface components based on the location of the control device 230, in other examples user components may be only disabled. That is, the user interface components may remain visible to the user, but they may be rendered inactive when the control device 230 is not located in a region in the passenger compartment 210 where it is permitted to invoke instructions associated with the user interface components.

As discussed above, varying the operational capabilities of the control device 230 in dependence upon its location may enable the allocation of different privileges to different occupants of a vehicle. This concept may be applied particularly in mass transit applications. In such applications, the control device 230 may be used to provide different electronic services (e.g., playing movies, playing music, electronically requesting a drink or another amenity from wait staff) in dependence upon its location. For example, control devices that are located towards the front of an air plane (first class) may be permitted to play a greater selection of movies than devices located in the economy class portions of the plane. Similarly, control devices located only in the first-class section of the airplane, may be enabled to display a menu that allows their users to electronically order a drink. Accordingly, in instances where the control device 230 is used to render electronic services to mass transit passengers, the decision of whether a particular electronic service (e.g., playing movies at all, playing a particular movie, requesting a drink, or requesting another amenity) may be rendered by the control device 230 to a user may depend, at least in part, on the device's location. In such instances, the process 800 may be performed by a media server, a computing device used by wait staff to receive orders, or another similar device.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A vehicle comprising:
a passenger compartment configured to accommodate one or more passengers;
a plurality of vehicle systems;
a vehicle control unit operatively connected to each vehicle system, the vehicle control unit including a processor and a memory, the memory storing:
  (i) a first indication of a first location within the passenger compartment from where a portable device is permitted to change the state of a first vehicle system of the plurality,
  (ii) a second indication of a second location within the passenger compartment from where the portable device is permitted to change the state of a second vehicle system of the plurality;
wherein the processor is configured to:
receive a first instruction from the portable control device to change a first state of the first vehicle system;
receive a second instruction from the portable control device to change a second state of the second vehicle system;
determine a current location of the portable control device in the passenger compartment;
determine, based on the first indication and the current location of the portable control device, whether the first instruction is permitted to be executed;
determine, based on the second indication and the current location of the portable control device, whether the second instruction is permitted to be executed; and
execute the first instruction, but not the second instruction, in response to determining that only the first instruction is permitted to be executed when the portable control device is located at its current location.

2. The vehicle of claim 1, wherein the first system is a steering system and the first instruction is permitted to be executed only when the portable control device is located at a driver seat of the vehicle.

3. The vehicle of claim 1, wherein the first system is an entertainment system and the first instruction is permitted to be executed only when the portable control device is located at a driver seat or a front passenger seat of the vehicle.

4. The vehicle of claim 1, wherein the first location is part of a first region of the passenger compartment and the second location is part of a second region of the passenger compartment.

5. The vehicle of claim 1, wherein the portable control device is one of a smart phone, a tablet, or a laptop.

6. The vehicle of claim 1, wherein the portable control device is connected to the vehicle control unit via a wireless connection.

7. An apparatus comprising:
an output device;
a memory storing a data structure that relates:
  (i) a first user interface component with a first region in a passenger compartment of a vehicle, thereby indicating that the apparatus is permitted to output the first user interface component on the output device when the apparatus is located in the first region;
  (ii) a second user interface component with a second region in the passenger compartment of the vehicle, thereby indicating that the apparatus is permitted to output the second user interface component on the output device when the apparatus is located in the second region; and
a processor coupled to the output device and the memory, the processor being configured to:
determine a current location of the apparatus within the vehicle;
determine, based on the current location of the apparatus and the data structure stored in the memory, whether the first user interface component is permitted to be output;
determine, based on the current location of the apparatus and the data structure stored in the memory, whether the second user interface component is permitted to be output;
output the first user interface component using the output device upon determining that the first user interface component is permitted to be output; and
output the second user interface component using the output device upon determining that the second user interface component is permitted to be output.

8. The apparatus of claim 7, wherein:
the output device is one of a display screen or a speaker; and
outputting the first user interface component using the output device includes one of rendering the first user interface component on the display screen or playing a sound representing the first user input component.

9. The apparatus of claim 7, wherein:
the vehicle includes a first vehicle system and a second vehicle system;
the first user interface component is configured to receive user input to change a state of the first vehicle system; and the second user interface component is configured to receive user input to change a state of the second vehicle system.

10. The apparatus of claim 9, wherein the first vehicle system is a braking system and the second vehicle system is an entertainment system.

11. The apparatus of claim 7, wherein:
the first user interface component is part of a first user interface;
the second user interface component is part of a second user interface;
the data structure indicates that the first user interface is permitted to be output using the output device when the apparatus is located in the first region; and
the data structure indicates that the second user interface is permitted to be output using the output device when the apparatus is located in the second region.

12. A method for managing instruction execution in a vehicle having a plurality of vehicle systems, the method comprising:
receiving a first instruction from a portable control device to change a state of a first one of the plurality of vehicle systems;
receiving a second instruction from the portable control device to change a state of a second one of the plurality of vehicle systems;
determining, by one or more processors, a current location of the portable control device in a passenger compartment of the vehicle;
determining, by the one or more processors, based on a first indication of a first location within the passenger compartment and the current location of the portable control device, whether the first instruction is permitted to be executed, the first indication identifying whether the portable control device is permitted to change the state of the first vehicle system;
determining, by the one or more processors, based on a second indication of a second location within the passenger compartment and the current location of the portable control device, whether the second instruction is permitted to be executed, the second indication identifying whether the portable control device is permitted to change the state of the second vehicle system; and
executing, by the one or more processors, the first instruction, but not the second instruction, in response to determining that only the first instruction is permitted to be executed when the portable control device is located at the current location.

13. The method of claim 12, wherein the first system is a steering system and the first instruction is permitted to be executed only when the portable control device is located at a driver seat of the vehicle.

14. The method of claim 12, wherein the first location is part of a first region of the passenger compartment and the second location is part of a second region of the passenger compartment.

15. The method of claim 1, wherein the portable control device is connected to the vehicle control unit via a wireless connection.

16. A method for outputting information in a vehicle having a plurality of vehicle systems, the method comprising:
associating a first user interface component with a first region in a passenger compartment of a vehicle, thereby indicating that an apparatus is permitted to output the first user interface component on an output device when the apparatus is located in the first region;
associating a second user interface component with a second region in the passenger compartment of the vehicle, thereby indicating that the apparatus is permitted to output the second user interface component on the output device when the apparatus is located in the second region;
determining, by one or more processors, a current location of the apparatus within a vehicle;
determining, by the one or more processors based on the current location of the apparatus and the association of the first user interface component with the first region, whether the first user interface component is permitted to be output;
determining, by the one or more processors based on the current location of the apparatus and the association of the second user interface component with the second region, whether the second user interface component is permitted to be output;
outputting the first user interface component using the output device upon determining that the first user interface component is permitted to be output; and
outputting the second user interface component using the output device upon determining that the second user interface component is permitted to be output.

17. The method of claim 16, wherein outputting the first user interface component using the output device includes one of rendering the first user interface component on a display screen or playing a sound representing the first user input component.

18. The method of claim 16, wherein:
the vehicle includes a first vehicle system and a second vehicle system;
the first user interface component is configured to receive user input to change a state of the first vehicle system; and
the second user interface component is configured to receive user input to change a state of the second vehicle system.

19. The method of claim 18, wherein the first vehicle system is a braking system and the second vehicle system is an entertainment system.

20. The method of claim 16, wherein:
the first user interface component is part of a first user interface;
the second user interface component is part of a second user interface;
the first user interface is permitted to be output using the output device when the apparatus is located in the first region; and
the second user interface is permitted to be output using the output device when the apparatus is located in the second region.

* * * * *